(12) United States Patent
Clemens et al.

(10) Patent No.: US 7,603,361 B2
(45) Date of Patent: Oct. 13, 2009

(54) DATA PROCESSING METHODS AND SYSTEMS FOR USE IN INDUSTRIAL CONTROL

(75) Inventors: Achim Clemens, Speyer (DE); Tim Gaiser, Sinsheim (DE); Markus Klein, Frankenthal (DE); Ralf Kühner, Kaiserslautern (DE); Manfred Metz, Karlsruhe (DE)

(73) Assignee: SAP AG., Walldorf (DE)

( * ) Notice: Subject to any disclaimer, the term of this patent is extended or adjusted under 35 U.S.C. 154(b) by 481 days.

(21) Appl. No.: 10/855,522

(22) Filed: May 28, 2004

(65) Prior Publication Data

US 2005/0125441 A1    Jun. 9, 2005

(30) Foreign Application Priority Data

Dec. 9, 2003    (EP)    ............................. 03028318

(51) Int. Cl.
G06F 7/00    (2006.01)
G06F 17/00    (2006.01)

(52) U.S. Cl. .................. 707/100; 707/1; 707/3; 707/10

(58) Field of Classification Search ................ 707/100
See application file for complete search history.

(56) References Cited

U.S. PATENT DOCUMENTS

| | | | | |
|---|---|---|---|---|
| 4,408,291 A * | 10/1983 | Gunzberg et al. | ........... | 700/115 |
| 5,301,120 A | 4/1994 | Magario | ............ | 364/476 |
| 5,461,570 A * | 10/1995 | Wang et al. | ........... | 700/110 |
| 5,537,590 A * | 7/1996 | Amado | ............ | 707/2 |
| 5,964,656 A | 10/1999 | Lawler et al. | | |
| 6,256,624 B1 * | 7/2001 | Pollard et al. | ........... | 707/3 |
| 6,321,272 B1 * | 11/2001 | Swales | ............ | 709/250 |
| 6,839,713 B1 * | 1/2005 | Shi et al. | ............ | 707/101 |
| 7,035,877 B2 * | 4/2006 | Markham et al. | ........... | 707/200 |
| 7,054,919 B2 * | 5/2006 | Cramer et al. | ............ | 709/218 |
| 2003/0158795 A1 | 8/2003 | Markham et al. | | |
| 2003/0195940 A1 * | 10/2003 | Basu et al. | ........... | 709/213 |
| 2004/0122871 A1 * | 6/2004 | Hansen et al. | ............ | 707/204 |
| 2005/0065839 A1 * | 3/2005 | Benson et al. | ............ | 705/10 |

FOREIGN PATENT DOCUMENTS

| | | |
|---|---|---|
| EP | 1204042 | 5/2002 |
| EP | 1385070 | 1/2004 |
| FR | 2765364 | 12/1998 |
| FR | 2814252 | 3/2002 |

OTHER PUBLICATIONS

Provisional Application 60/504,898 filed Sep. 3, 2003.*
Provisional Application 60/504,804 filed Sep. 22, 2003.*
International Search Report from the European Patent Office, dated Apr. 21, 2005 (4 pages).
European Search Report from the European Patent Office dated May 12, 2004.

* cited by examiner

Primary Examiner—Tim T. Vo
Assistant Examiner—Jay A Morrison
(74) Attorney, Agent, or Firm—Finnegan, Henderson, Farabow, Garrett & Dunner, LLP

(57) ABSTRACT

Data processing methods and systems are disclosed for use in industrial control. The methods and systems may include receiving control data from automation components of an industrial control system by a first computer system, the first computer system being coupled to the automation components by means of a first network, storing at least some of the control data in a first database by the first computer system, performing a database query of the first database for determination of a subset of the control data, aggregating the control data of the subset, and transmitting the aggregated control data to a second computer system over a second network.

24 Claims, 3 Drawing Sheets

DATA PROCESSING METHODS AND SYSTEMS FOR USE IN INDUSTRIAL CONTROL

BACKGROUND OF THE INVENTION

1. Field of the Invention

The present invention generally relates to the field of industrial control systems and computerized data processing methods and systems. More particularly, and without limitation, the invention relates to data processing methods and systems for use in industrial control.

2. Background Information

Sophisticated industrial processes, such as oil refining, automobile assembly or power generation, require the cooperative execution of numerous interdependent tasks by many different pieces of equipment. The enormous complexity of ensuring proper task sequencing and management, which requires not only procedural logic but constant monitoring of equipment states to organize and distribute operations and detect malfunction, has resulted in the widespread adoption of programmable controllers.

These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing. The "inputs" to a particular controller can extend beyond the sensed state of the equipment that the controller directly operates to include, for example, its environment, the state of related machinery or the state of its controllers.

Control requirements become even more complex when different aspects of the same overall process are assigned to remotely situated equipment. Such configurations often require reliable, high-bandwidth, and real-time serial communication links to provide the necessary interconnection and to handle data transfer among controllers and the sensors relevant to their operation.

Ordinarily, process operation is monitored, at least intermittently, by supervisory personnel by means of one or more central management stations. Each station samples the status of controllers (and their associated sensors) selected by the operator and presents the data in some meaningful format. The management station may or may not be located on the same site as the monitored equipment; frequently, one central station has access to multiple sites (whether or not these perform related processes). Accordingly, communication linkage can be vital even in traditional industrial environments where process equipment is physically proximate, since at least some supervisory personnel may not be.

To facilitate the necessary communication, the controller processors and related computers (such as monitoring stations) are arranged as a computer network. A network, basically, is a collection of interconnected computers that use some consistent protocol to communicate with one another. Typically, the network is organized such that any computer may communicate with any other network computer. The communication protocol provides a mechanism by which messages can be decomposed and routed to a destination computer identified by some form of address.

Typically, the various components of such an industrial control system are interconnected by means of a field bus having real-time capability, such as PROFIBUS or real-time Ethernet. Such bus systems have real-time capability in order to guarantee maximum latency times for transmission of control data between the various components of the industrial control system.

U.S. Pat. Nos. 5,805,442 and 6,484,0621 are illustrative of examples for such industrial control systems.

SUMMARY OF THE INVENTION

Embodiments consistent with the present invention provide for data processing methods and systems for use in industrial control. In accordance with one embodiment, a computer system of an industrial control system receives control data from various automation components, such as controllers, sensors, actuators and/or data entry terminals. The automation components and the computer system may be coupled by means of a network, such as a real-time field bus.

As disclosed herein, the computer system may include a database for storing control data. In one embodiment, the database is queried in order to determine a subset of the control data. Control data of the subset is aggregated and transmitted to an external computer system over another network for offline processing of the aggregated control data.

The database query may be performed when the load of the real-time network is low. A database query can be triggered by a component that monitors network load. Alternatively, the database query is triggered at predefined points of time. This has the advantage that the real-time capability of the computer system is not negatively influenced by the database query and the transmission of the control data to the external computer system.

Further, as another advantage of such an arrangement, the amount of data that is transmitted from the computer system of the industrial control system to the external computer system is reduced. As a further consequence, the storage and data processing capacity requirements for the external computer system are also reduced, as the external computer system does not receive the raw control data but aggregated control data for further offline processing.

In accordance with another embodiment of the invention, the control data may be expressive of a quantity of a valuation unit. A valuation unit can be any entity that is used or occurs in the production process and that has a financial value, such as a product unit or a work unit. Each valuation unit may be identified by means of a unique identifier. The aggregation of the control data may be performed based on predefined similarity criteria of the valuation units. The similarity criteria may determine the level of granularity that is required for the later offline processing by the external computer system.

For example, various types of household appliances are produced in a factory, such as refrigerators of various sizes. In this example, the level of granularity that is of interest for the offline processing may be the size of the refrigerators, whereas the colors of the refrigerators are of no interest. Hence, the amount of refrigerators of a given size that are reported from the automation components are aggregated and transmitted to the external computer system.

In accordance with another embodiment of the invention, the unique identifiers that are used to designate the valuation units may have a hierarchical structure. In this instance, a predefined portion of the unique identifiers may be used to define clusters of the valuation units for the purpose of aggregating the respective control data. For example, all valuation units that have an identical sequence of leading bit positions of their unique identifiers are considered to be similar for the purpose of aggregating the respective control data.

In accordance with yet another embodiment of the invention, the offline computer system may perform a financial valuation of the aggregated control data. In other words, the offline computer system calculates a monetary value for similar valuation units that have been reported from the industrial control system. These monetary values are entered as postings in a ledger, such as for the purpose of book keeping, financial evaluation and/or financial reporting.

In accordance with another embodiment of the invention, the aggregated control data is transmitted from the industrial control system to the external computer system by means of a document. SAP's exchange infrastructure (XI) may be used for this purpose. Alternatively, other types of self-descriptive documents can be used, such as mark-up language documents, e.g., hypertext mark up language (HTML) or extended mark up language (XML) documents.

The various embodiments can include and/or exclude different aspects, features and/or advantages, where applicable. In addition, various embodiments can combine one or more aspects or features of other embodiments, where applicable.

It is to be understood that both the foregoing general description and the following detailed description are exemplary and explanatory only and are not restrictive of the invention, as claimed.

BRIEF DESCRIPTION OF THE DRAWINGS

In the following embodiments of the invention will be described in greater detail by way of example only with reference to the drawings in which.

DETAILED DESCRIPTION

The following detailed description of embodiments of the present invention refers to the accompanying drawings. Where appropriate, the same reference numbers in different drawings refer to the same or similar elements.

Figure 1:
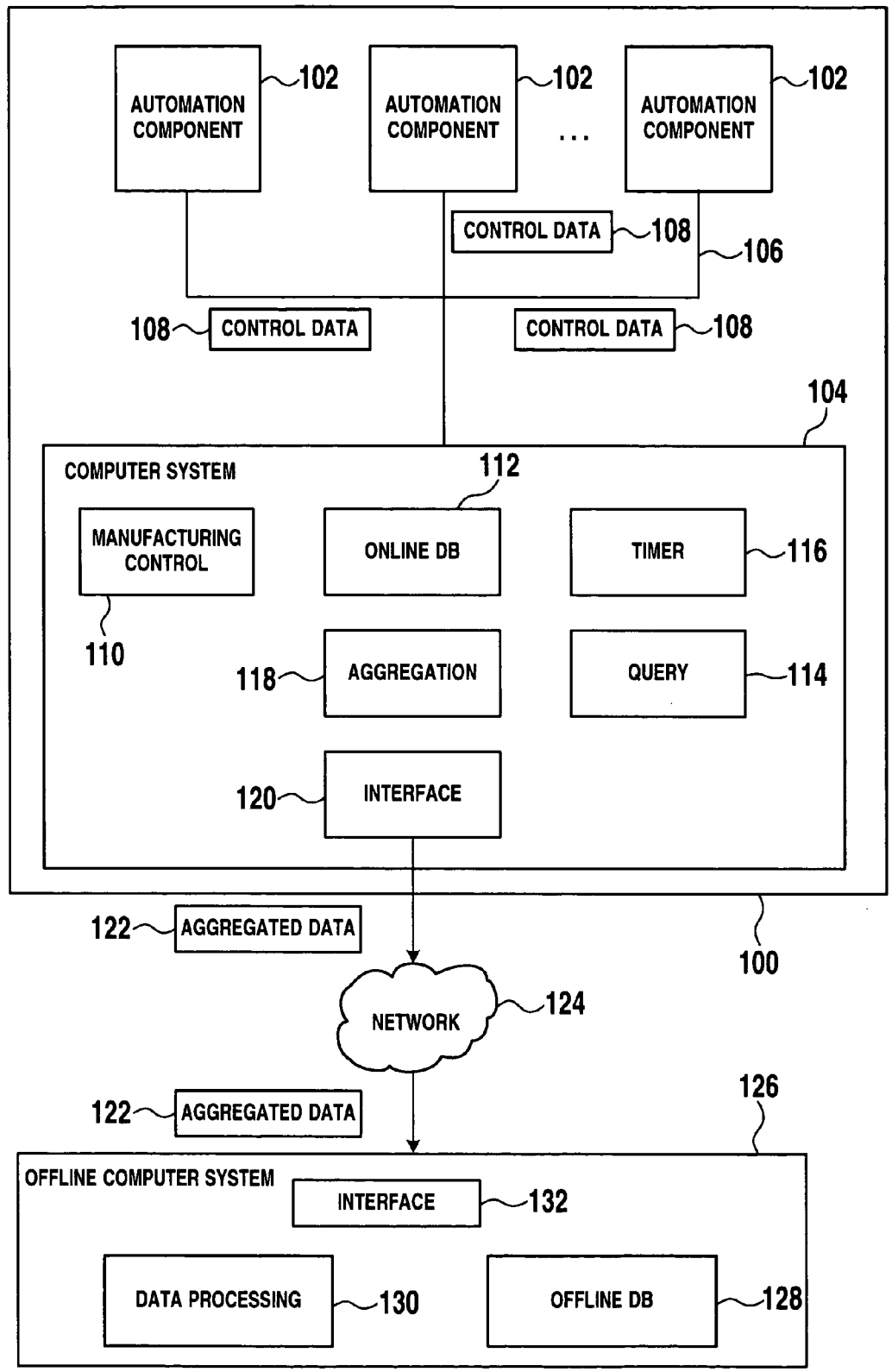
FIG. 1 is a block diagram of an exemplary industrial control system, consistent with an embodiment of the invention.

FIG. 1 shows an exemplary industrial control system 100, consistent with an embodiment of the invention. System 100 may be used for industrial control, such as the control of a manufacturing process. As shown in FIG. 1, industrial control system 100 may include various automation components 102, such as sensors, actuators, intelligent drives, controllers, etc. Further, industrial control system 100 may include a computer system 104 that provides control functionality.

In the embodiment of FIG. 1, a network 106 interconnects the automation components 102 and computer system 104. Computer system 104 receives various control data 108 from automation components 102. Control data 108 may include measurement values, such as speed, temperature, humidity, or logical information regarding the state of an automation component 102. Further, control data 108 may include messages that indicate quantities of valuation units.

The term "valuation unit", as used herein, may include a product unit or a product subunit, a component or other kind of material that is used for the ongoing production, as well as a work unit, such as manufacturing service provided by a human and/or a machine. Each type of valuation unit is identified by a unique identifier that is transmitted as part of the control data 108 to computer system 104.

Computer system 104 has program component 110 for providing a manufacturing control functionality on the basis of the control data 108 that is received by computer system 104. Further computer system 104 has online database 112 for storage of at least some of the control data 108 that contains data concerning the valuation units. Computer system 104 and/or offline computer system 126 may also comprise at least one computer-readable storage medium.

A program component 114 serves to perform a predefined database query in order to determine a subset of the control data that is stored in online database 112. Such a database query may be triggered by program component 116. Program component 116 can be implemented as a timer that has a predefined timer value. When the timer expires, program component 116 triggers program component 114 to execute the database query. Alternatively, program component 116 monitors the present load situation of network 106 and/or the present data processing load of computer system 104. When the actual load is below a threshold value, this indicates that computer system 104 has sufficient unused capacity in order to perform the database query without negatively impacting the real-time capability of program component 110.

A program component 118 serves to aggregate control data that has been extracted from online database 112 as a result of the query that has been performed by program component 114. For example, program component 118 aggregates control data of similar valuation units.

Further, computer system 104 may include an interface 120 for transmitting of aggregated data 122 via network 124 to an offline computer system 126.

Consistent with an embodiment of the invention, network 106 of industrial control system 100 as well as program component 110 and online database 112 may be implemented with real-time capabilities. In other words, maximum latency times for transmitting, storing, processing and responding to control data 108 that is received by computer system 104 via network 106 may be guaranteed under all circumstances in order to ensure proper functioning of industrial control system 100.

In contrast, network 124 and computer system 126 do not need to have such real-time capabilities, as computer system 126 is not directly involved in the ongoing process control. As shown in FIG. 1, computer system 126 may include an offline database 128 for storage of aggregated data 122. This can have the purpose of documentation of the ongoing process, such as for the purpose of product liability documentation, and/or other reporting purposes.

In operation, control data 108 is reported from the automation components 102 to computer system 104. For the purpose of explanation it is assumed that refrigerators of various colors and sizes are produced in the production process, e.g., red, blue, and white refrigerators having capacities of 150 liters, 170 liters and 230 liters. For the purpose of valuation only, the number of refrigerators of a certain size irrespective of color is of interest.

Program component 114 has corresponding predefined database queries for determining control data relating to refrigerators having 150 liters, 170 liters and 230 liters capacity respectively, irrespective of color.

In the example considered here, assume that the production of the refrigerators is interrupted during the night. Program component 116 has a timer that is programmed to trigger program component 114 one hour after the stop of the production. Program component 114 executes its queries in order to extract a subset of control data relating to refrigerators that have been produced during the day having 150 liters capacity and separate subsets of the control data relating to such refrigerators having 170 liters and 230 liters capacity, respectively.

Program component 118 aggregates control data of the respective subsets. This results in aggregated control data indicating the quantity of 150 liters refrigerators, 170 liter refrigerators and 230 liter refrigerators that have been produced during the day. These aggregated data are transmitted from interface 120 via network 124 to offline computer system 126.

Data processing component 130 valuates the aggregated data 122. For example, data processing component 130 determines the accumulated values of 150 liters, 170 liters, and 230 liter refrigerators that have been produced during the day on the basis of aggregated data 122 and predefined refrigerator costs that do not depend on the refrigerators color. The resulting values may be posted in offline database 128 that has the role of an electronic ledger.

Figure 2:
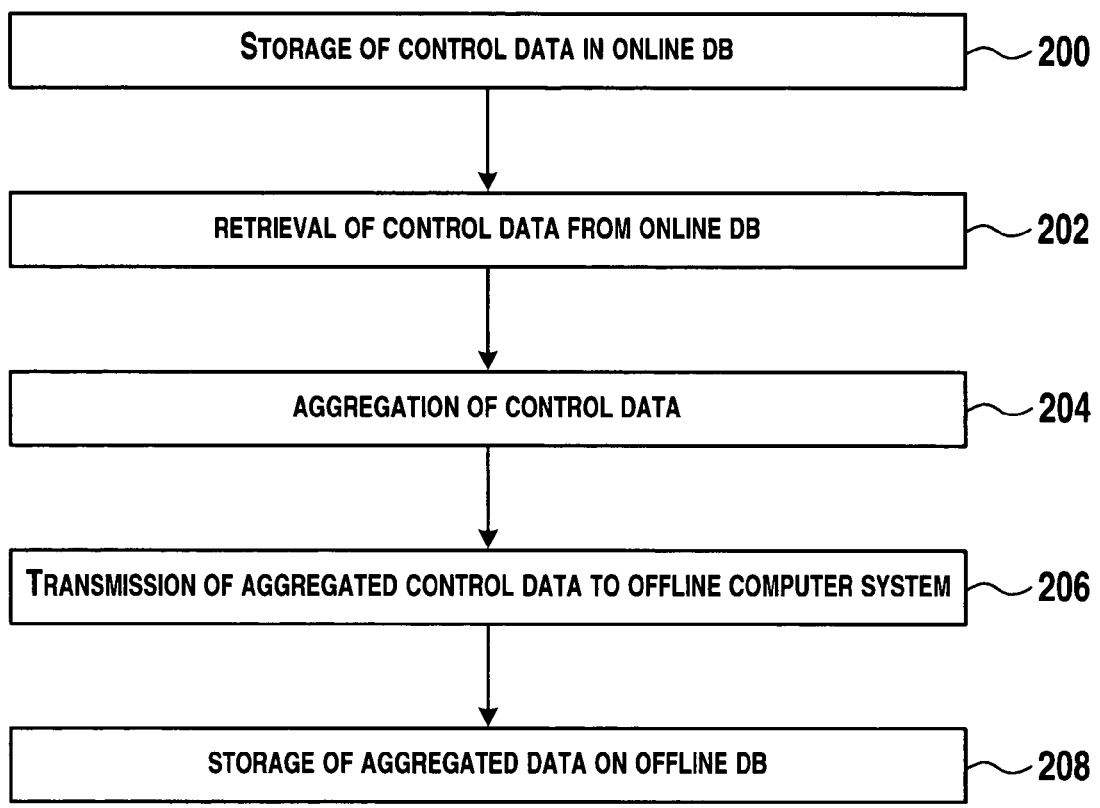
FIG. 2 is a flow diagram of an exemplary method, consistent with an embodiment of the invention.

FIG. 2 illustrates a flow chart of an exemplary method, consistent with an embodiment of the invention. The exemplary method of FIG. 2 may be used in combination with the embodiment of FIG. 1 or other industrial control systems, consistent with the teachings of the invention.

In stage 200, control data received from the automation components of the industrial control system is stored in the online database. This stage may be performed during the ongoing production. When the network load of the real-time network of the industrial control system is low or zero, such as when the production process is interrupted during the night, control data that is of interest for reporting to external computer system is retrieved from the online database (stage 202). This data is aggregated in stage 204 and then transmitted to the offline computer system in stage 206. Finally, the aggregated data is stored on a database of the offline computer system in stage 208.

The method of FIG. 2 has the advantage that the computer system of the industrial control system is not burdened with the reporting of data to the external computer system or only to an extent that does not jeopardize the real-time capability of the computer system(s) of the industrial control system. Further, this limits the amount of data that needs to be transmitted over network 124, as only aggregated data having a level of granularity that corresponds to the needs of the external computer system is transmitted. This may also provide the further beneficial consequence that the loading of the external computer system is minimized in terms of both storage and data processing requirements.

Figure 3:
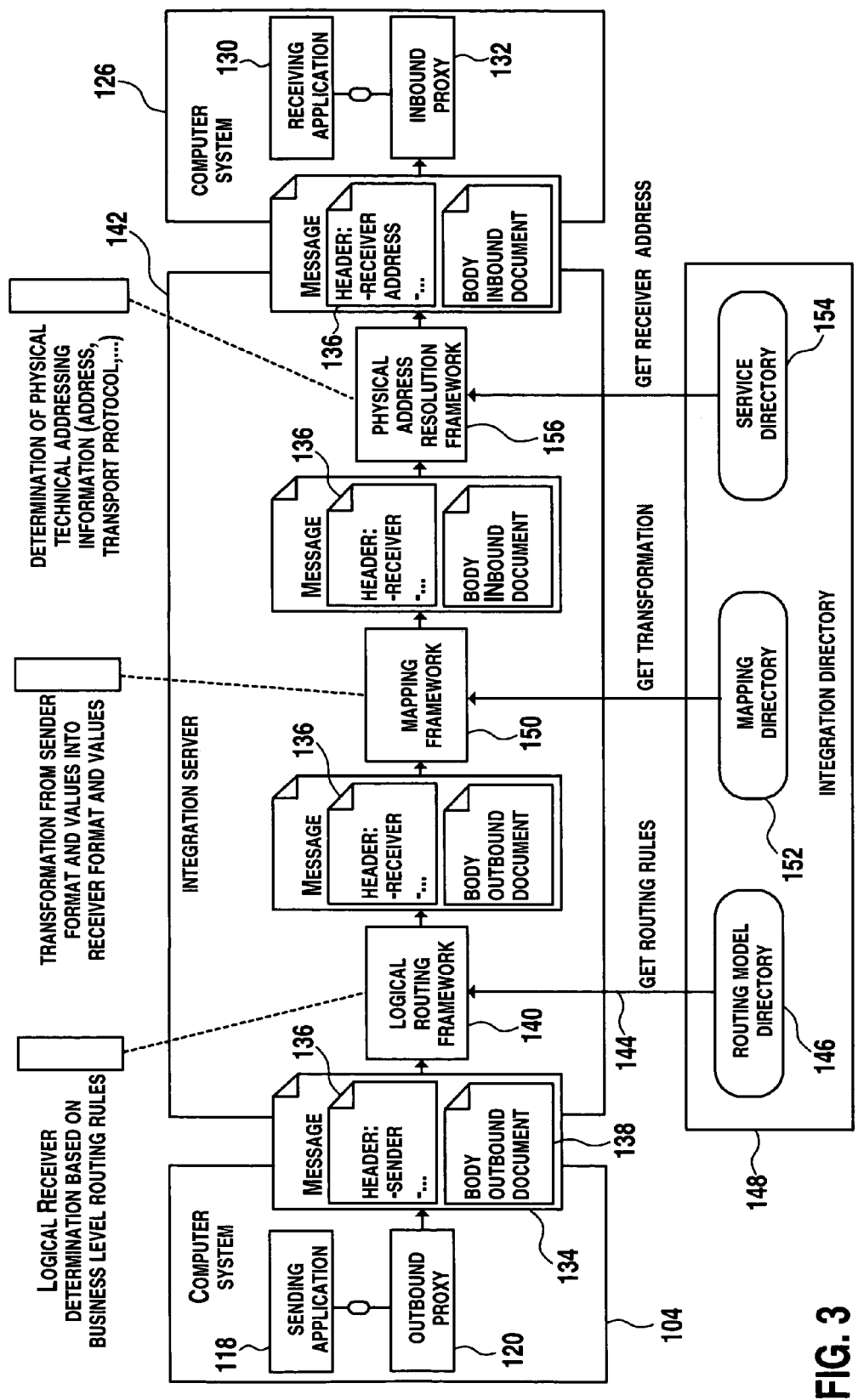
FIG. 3 is a block diagram illustrating an example of usage of an exchange infrastructure (XI) for transmission of aggregated control data, consistent with an embodiment of the invention.

FIG. 3 illustrates exemplary message flow from computer system 104 to offline computer system 126. The example of FIG. 3 is embodied using SAP's exchange infrastructure (XI). As will be appreciated by one skilled in the art, other infrastructures and/or protocols may be utilized to facilitate message flow, consistent with the present invention.

In the XI framework, computer system 104 may take the role of the sending component. Further, program component 118 may take the role of a sending application, whereas interface 120 is realized by means of an outbound proxy.

Likewise, in the embodiment of FIG. 3, computer system 126 takes the role of a receiving component system, data processing component 130 takes the role of a receiving application, and interface 132 is realized as an inbound proxy. Initially, program component 118 calls the outbound proxy of interface 120. This causes the generation of a message 134 as, for example, an XML document.

Consistent with an embodiment of the invention, message 134 may include a header 136 that contains information about the sender, and the outbound interface and a body 138 that contains the outbound document, i.e., aggregated data 122.

Using a routing framework 140, integration server 142 then determines the receiver and the inbound interface according to the routing rules 144 of a routing model directly 146 contained within an integration directory 148.

After this determination, the header 136 of the message 134 is modified to contain the receiver and the inbound interface. Then, using a mapping framework 150 that communicates with a mapping directory 152, the message 134 is transformed from the sender's format and values into the receiver's format and values. After this transformation, the body 138 of the message 134 contains the document converted to the inbound format, i.e., the structure that the receiver understands. Finally, the physical address of the receiver is determined using the data of the system landscape directory and by communicating with a service directory 154. The determination of the technical addressing information may be performed by physical address resolution framework 156 on this basis. That information is added to the header 136 of the message 134 and the message is sent to the receiving computer system 126.

In essence, integration server 142 and integration directory 148 provide a transport layer for transmitting message 134 from the program component 118, i.e., the sending application, to the data processing component 130, i.e., the receiving application.

The usage of XI has the advantage that various receiving computer systems can be coupled to computer system 104 without a need to change computer system 104 and its data formats. This can be important to maintain computer system's 104 real-time capabilities irrespective of the needs of the external receiving computer system.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

Accordingly, other embodiments of the invention will be apparent to those skilled in the art from consideration of the specification and practice of the invention disclosed herein. It is therefore intended that the specification and examples be considered as exemplary only, with a true scope and spirit of the invention being indicated by the following claims.

What is claimed is:

1. A data processing method comprising:
receiving control data from automation components of an industrial control system by a first computer system, the first computer system being coupled to the automation components by a first network, wherein the first network includes real-time capabilities;
storing, by the first computer system, the control data in a first database;
accessing, by the first computer system, a predefined database query;
performing, by the first computer system, the predefined database query on the first database to determine a subset of the control data, wherein the performing of the predefined database query is triggered by the first computer system when a load of the first computer system is low;
aggregating the control data of the subset by aggregating quantities of similar valuation units,
wherein each of the valuation units comprise a unique identifier,
wherein the similar valuation units are identified by decoding a predetermined portion of the unique identifiers, and
wherein the valuation units comprise at least one of units or subunits for manufacture by the industrial control system; and
transmitting the aggregated control data to a second computer system over a second network,
wherein the second computer system executes offline processing to financially value the similar valuation units, and wherein a second database of the second computer system includes a ledger.

2. The data processing method of claim 1, wherein the control data has a unique identifier of a valuation unit.

3. The method of claim 1, wherein the control data comprises data expressive of a quantity of a valuation unit.

4. The method of claim 1, wherein the database query is performed when at least one of:
a load of the first network is low;
a periodic interval passes;
a pre-programmed timer expires;
an actual load is below a threshold value; or
production is stopped.

5. The method of claim 1, wherein the first network is a field bus.

6. The method of claim 1, wherein the second network is an internet protocol (IP)-type network.

7. The method of claim 1, further comprising generating a document containing the aggregated control data, and wherein transmitting the control data comprises transmitting the document.

8. The method of claim 7, wherein the document is an exchange infrastructure type document.

9. The method of claim 7, wherein the document is a mark-up language document, such as a hyper text mark-up language (HTML) or extended mark-up language (XML) document.

10. The method of claim 1, wherein the second computer is coupled to a second database for storage of the aggregated control data.

11. A computer-readable storage medium including instructions that perform, when executed by a processor, a method for data processing, the method including the steps of:
receiving control data from automation components of an industrial control system by a first computer system, the first computer system being coupled to the automation components by a first network, wherein the first network includes real-time capabilities;
storing, by the first computer system, the control data in a first database;
accessing, by the first computer system, a predefined database query;
performing, by the first computer system, the predefined database query on the first database to determine a subset of the control data, wherein the performing of the predefined database query is triggered by the first computer system when a load of the first computer system is low;
aggregating the control data of the subset by aggregating quantities of similar valuation units,
wherein each of the valuation units comprise a unique identifier,
wherein the similar valuation units are identified by decoding a predetermined portion of the unique identifiers, and
wherein the valuation units comprise at least one of units or subunits for manufacture by the industrial control system; and
transmitting the aggregated control data to a second computer system over a second network,
wherein the second computer system executes offline processing to financially value the similar valuation units, and wherein a second database of the second computer system includes a ledger.

12. The computer-readable storage medium of claim 11, wherein the database query is performed when at least one of:
a load of the first network is low;
a periodic interval passes;
a pre-programmed timer expires;
an actual load is below a threshold value; or
production is stopped.

13. A computer system for controlling a manufacturing process, the computer system comprising:
means for receiving control data from automation components of an industrial control system via a first network, wherein the first network includes real-time capabilities;
a first database storing the control data to computer memory of the first database;
a query module including a predefined database query;
means for performing the predefined database query on the first database to determine a subset of the control data, wherein the means for performing the predefined database query occurs when a load of the first computer system is low;
means for aggregating the control data of the subset by aggregating quantities of similar valuation units,
wherein each of the valuation units comprise a unique identifier,
wherein the similar valuation units are identified by decoding a predetermined portion of the unique identifiers, and wherein the valuation units comprise at least one of units or subunits for manufacture by the industrial control system; and means for transmitting the aggregate control data to a second computer system, where the control data can be processed offline, wherein the second computer system executes offline processing to financially value the similar valuation units, and wherein a second database of the second computer system includes a ledger.

14. The computer system of claim 13, further comprising means for initiating the database query when at least one of:

a load of the first network is low;

a periodic interval passes;

a pre-programmed timer expires;

an actual load is below a threshold value; or production is stopped.

15. The computer system of claim 13, wherein the first network comprises a field bus.

16. An industrial control system comprising:

a plurality of automation components;

a first computer system;

a real-time network coupling of the automation components to the first computer system;

an online database storing the control data received by the first computer system from the automation components via the real-time network;

a query module including a predefined database query;

means for performing the predefined database query on the first database to determine a subset of the control data stored in the first database, wherein the means for performing the predefined database query is triggered by the first computer system when a load of the first computer system is low;

means for aggregating the control data of the subset by aggregating quantities of similar valuation units, wherein each of the valuation units comprise a unique identifier, wherein the similar valuation units are identified by decoding a predetermined portion of the unique identifiers, and wherein the valuation units comprise at least one of units or subunits for manufacture by an industrial control system; and means for transmitting the aggregated control data to a second computer system via a non-real-time network for offline processing of the aggregated control data by the second computer system, wherein the second computer system executes offline processing to financially value the similar valuation units, and wherein a second database of the second computer system includes a ledger.

17. The method of claim 1, wherein the valuing of the similar valuation units is used for at least one of book keeping, financial evaluation, and financial reporting.

18. The computer-readable storage medium of claim 11, wherein the valuing of the similar valuation units is used for at least one of book keeping, financial evaluation, and financial reporting.

19. The computer system of claim 13, wherein the valuing of the similar valuation units is used for at least one of book keeping, financial evaluation, and financial reporting.

20. The industrial control system of claim 16 wherein the valuing of the similar valuation units is used for at least one of book keeping, financial evaluation, and financial reporting.

21. The method of claim 1, wherein:

the real-time capabilities guarantee a maximum latency time for transmitting, storing, processing, and/or responding to the control data from the automation components, in order to ensure proper functioning of the industrial control system;

the first computer system, first database, and first network include the real-time capabilities; and the performing of the predefined database query when the load of the first computer system is low does not negatively affect the guaranteed maximum latency time.

22. The computer-readable storage medium of claim 11, wherein:

the real-time capabilities guarantee a maximum latency time for transmitting, storing, processing, and/or responding to the control data from the automation components, in order to ensure proper functioning of the industrial control system;

the first computer system, first database, and first network include the real-time capabilities; and the performing of the predefined database query when the load of the first computer system is low does not negatively affect the guaranteed maximum latency time.

23. The computer system of claim 13, wherein:

the real-time capabilities guarantee a maximum latency time for transmitting, storing, processing, and/or responding to the control data from the automation components, in order to ensure proper functioning of the industrial control system;

the first computer system, first database, and first network include the real-time capabilities; and the means for performing the predefined database query when the load of the first computer system is low does not negatively affect the guaranteed maximum latency time.

24. The industrial control system of claim 16, wherein:

the real-time capabilities guarantee a maximum latency time for transmitting, storing, processing, and/or responding to the control data from the automation components, in order to ensure proper functioning of the industrial control system;

the first computer system, first database, and first network include the real-time capabilities; and the means for performing the predefined database query when the load of the first computer system is low does not negatively affect the guaranteed maximum latency time.

* * * * *

UNITED STATES PATENT AND TRADEMARK OFFICE
CERTIFICATE OF CORRECTION

PATENT NO. : 7,603,361 B2  Page 1 of 1
APPLICATION NO. : 10/855522
DATED : October 13, 2009
INVENTOR(S) : Clemens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Fifth Day of October, 2010

David J. Kappos
*Director of the United States Patent and Trademark Office*